United States Patent
Granroth et al.

(10) Patent No.: US 10,633,251 B2
(45) Date of Patent: Apr. 28, 2020

(54) METHOD AND PLANT DESIGN FOR REDUCTION OF START-UP SULFUR OXIDE EMISSIONS IN SULFURIC ACID PRODUCTION

(71) Applicant: HALDOR TOPSØE A/S, Kgs. Lyngby (DK)

(72) Inventors: Mårten Nils Rickard Granroth, Bunkeflostrand (SE); Per Aggerholm Sørensen, Kgs. Lyngby (DK); Kurt Agerbæk Christensen, Birkerød (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 0 days.

(21) Appl. No.: 15/765,683

(22) PCT Filed: Oct. 24, 2016

(86) PCT No.: PCT/EP2016/075492
§ 371 (c)(1),
(2) Date: Apr. 3, 2018

(87) PCT Pub. No.: WO2017/076673
PCT Pub. Date: May 11, 2017

(65) Prior Publication Data
US 2019/0047859 A1    Feb. 14, 2019

(30) Foreign Application Priority Data
Nov. 6, 2015    (DK) ................................ 2015 00697

(51) Int. Cl.
*B01D 53/14*    (2006.01)
*C01B 17/765*    (2006.01)
(Continued)

(52) U.S. Cl.
CPC ...... *C01B 17/7655* (2013.01); *B01D 53/1481* (2013.01); *B01J 21/08* (2013.01);
(Continued)

(58) Field of Classification Search
None
See application file for complete search history.

(56) References Cited

U.S. PATENT DOCUMENTS 3,829,560 A * 8/1974 Fornoff .................. C01B 17/76
                                                                          423/522
3,988,129 A * 10/1976 Fornoff .................. B01D 53/04
                                                                             95/125

(Continued)

FOREIGN PATENT DOCUMENTS

DE          102 49 782        5/2004
WO    WO 2005/105666    11/2005
(Continued)

OTHER PUBLICATIONS

International Search Report with Written Opinion corresponding to International Patent Application No. PCT/EP2016/075492, dated Feb. 2, 2017.

(Continued)

*Primary Examiner* — Sheng H Davis
(74) *Attorney, Agent, or Firm* — Leydig, Voit & Mayer, Ltd.

(57) ABSTRACT

The invention is a method and a sulfuric acid plant design for reduction of start-up $SO_2$, $SO_3$ and $H_2SO_4$ emissions in sulfuric acid production, in which SO2 is converted to $SO_3$ in n successive catalyst beds, where n is an integer >1. The final catalytic beds are used as absorbents for $SO_2$ to SO3 during the start-up procedure, and one or more of the m beds downstream the first bed are purged, either separately or simultaneously, with hot gas, where m is an integer >1 and m<n, during the previous shut-down. Also, one separate purge with hot gas is used on the final bed.

20 Claims, 2 Drawing Sheets

Figure 1:
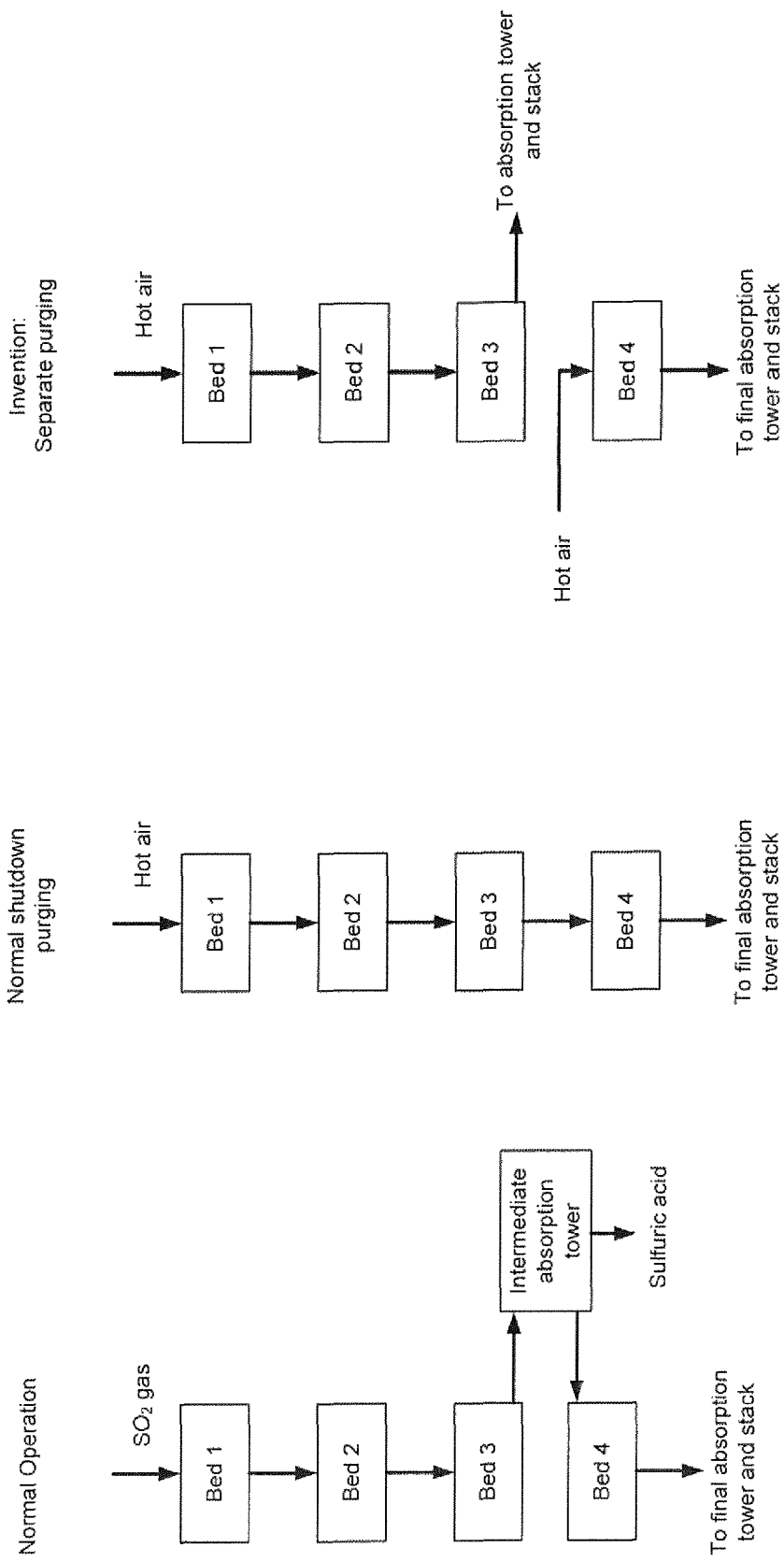

(51) Int. Cl.
*C01B 17/79* (2006.01)
*C01B 17/80* (2006.01)
*C01B 17/78* (2006.01)
*B01J 21/08* (2006.01)
*B01J 21/12* (2006.01)
*B01J 23/22* (2006.01)
*B01J 27/055* (2006.01)

(52) U.S. Cl.
CPC ............... *B01J 21/12* (2013.01); *B01J 23/22* (2013.01); *B01J 27/055* (2013.01); *C01B 17/78* (2013.01); *C01B 17/79* (2013.01); *C01B 17/803* (2013.01); *B01D 2255/202* (2013.01); *B01D 2255/20723* (2013.01); *B01D 2257/302* (2013.01); *Y02A 50/2348* (2018.01); *Y02A 50/2349* (2018.01)

(56) References Cited

U.S. PATENT DOCUMENTS

| | | | |
|---|---|---|---|
| 4,296,088 | A | 10/1981 | Stauffer et al. |
| 5,344,614 | A | 9/1994 | Tang et al. |
| 6,500,402 | B1 * | 12/2002 | Winkler ................ B01J 23/745 423/522 |
| 7,820,134 | B2 | 10/2010 | Daum et al. |
| 2006/0245997 | A1 | 11/2006 | Daum et al. |
| 2008/0056971 | A1 | 3/2008 | Hughes |
| 2010/0015035 | A1 | 1/2010 | Thielert |

FOREIGN PATENT DOCUMENTS

| | | |
|---|---|---|
| WO | WO 2009/065485 | 5/2009 |
| WO | WO 2012/068336 | 5/2012 |
| WO | WO 2015/058804 | 4/2015 |

OTHER PUBLICATIONS

Sørensen et al. (Oct. 2015), "New dynamic models for simulation of industrial SO2 oxidation reactors and wet gas sulfuric acid plants", Chemical Engineering Journal, vol. 278, pp. 421-429.

Gapinska et al. (1991), "Optimization of start-up and shut-down operations of catalytic reactors in sulfuric acid plants" (Polish: Optymalizacja operacji rozruchu i zatrzymywania kontaktowych reaktorów wytwórni kwasu siarkowego), Przemysl Chemiczny (1991), 70(10), 427-430, including English translation of abstract.

MECS® DuPont, "General Start-Up and Shutdown Instructions for a Sulfur Burning Sulfuric Acid Plant Converter Containing MECS® Catalyst for Sulfuric Acid", CAT-ST-010-0, © 2014.

* cited by examiner

METHOD AND PLANT DESIGN FOR REDUCTION OF START-UP SULFUR OXIDE EMISSIONS IN SULFURIC ACID PRODUCTION

CROSS-REFERENCE TO RELATED APPLICATIONS

This application is a 35 U.S.C. § 371 filing of International Application No. PCT/EP2016/075492, filed Oct. 24, 2016, which claims the benefit of and priority to Danish Patent Application No. PA 2015 00697, filed Nov. 6, 2015, which is hereby incorporated by reference in its entirety.

The present invention relates to a method and a plant design for reduction of start-up emissions of sulfur oxides, i.e. $SO_2$, $SO_3$ and $H_2SO_4$, in sulfuric acid production.

Sulfuric acid plants can basically produce three types of harmful (and thus regulated) gas emissions: Sulfur dioxide ($SO_2$), sulfur trioxide ($SO_3$) and sulfuric acid ($H_2SO_4$). Both $SO_3$ and $H_2SO_4$ are emitted as micron- or submicron-sized sulfuric acid mist because $SO_3$ reacts rapidly with water vapor present in the ambient air or in the process gas to produce $H_2SO_4$. While essentially all sulfuric acid plants have emission limitations during continuous operation, the regulation requirements during start-up of the plant vary widely. These start-up emissions are gaining still more attention from both regulatory authorities and sulfuric acid producers.

During plant start-up, the catalyst in the catalytic sulfuric acid converter is in a transition state from colder temperatures towards regular optimum operating conditions. When $SO_2$ is first passed over the catalyst, the $SO_2$ emissions may increase to above 1000 ppm for several minutes until regular temperature profiles are established. Also during start-up, as the sulfuric acid in the absorption towers heats up to normal optimum operating temperatures, the $SO_3$ absorption efficiency is lower, and a persistent acid plume may be seen from the plant stack until the acid temperature is sufficiently high.

Different strategies known in the art to reduce the $SO_2$ and $H_2SO_4$ emissions during start-up include catalyst selection, catalyst purging and pre-heating, simultaneous pre-heating of catalyst beds, sulfuric acid pre-heating, acid aerosol removal and sulfur oxide scrubbing. These strategies are e.g. described or at least mentioned in WO 2012/068336 A1, WO 2005/105666 A1, U.S. Pat. No. 7,820,134 B2, WO 2009/065485 A1, US 2010/0015035 A1, DE 102 49 782, US 2008/0056971 A1, U.S. Pat. No. 5,344,614 B2 and WO 2015/058804 A1.

The increased attention on emissions during start-up of sulfuric acid plants calls for a better understanding of the dynamics of the plants and the phenomena, which control the emissions of $SO_2$ and acid mist. Typically, sulfuric acid plants are designed by setting up steady-state heat and mass balances for the plant, and the equipment and catalyst volumes are sized based on steady-state models of individual unit operations. However, during start-up, shutdown and change of inlet feed, steady-state models may be inadequate for design and prediction of plant performance, and hence transient modelling is required.

In modern sulfuric acid plants, very low emissions of $SO_2$ and $H_2SO_4$ can be achieved during stable operation if the plant is properly designed and maintained. The minimum $SO_2$ emission is determined primarily by the catalytic sulfuric acid converter, and it is affected by the equilibrium of the $SO_2$ oxidation reaction (1), bed inlet temperatures, gas distribution and amounts and activities of the catalysts in the converter beds.

$$SO_2 + 1/2 O_2 <-> SO_3 + \text{heat} \tag{1}$$

During start-up of a sulfuric acid converter, the catalytic beds are pre-heated with hot air before introduction of the $SO_2$ feed gas. This pre-heating is necessary in order to "ignite" the $SO_2$ oxidation catalyst before $SO_2$ is introduced to the converter. The ignition temperature represents the lowest entering gas temperature for a specified adiabatic operating situation which will sustain a fairly close approach to equilibrium at the outlet. The industrially important vanadium pentoxide ($V_2O_5$) catalyst is a "supported liquid phase" (SLP) catalyst, where the active phase is a liquid salt mixture partly filling the pores of a porous support. At the ignition temperature, the salt mixture in the catalyst melts and dissolves part of the vanadium as active vanadium (V) compounds and also allows dissolution and diffusion of the gases ($SO_2$, $O_2$ and $SO_3$) in the liquid. The ignition temperature is typically in the range of 320-380° C. depending on the type of catalyst. As the temperature approaches the ignition temperature, $SO_3$ trapped in the catalyst during shut-down may be released, pass through the heat exchangers and generate a bluish-white plume of sub-micron acid aerosols. After the pre-heating stage, $SO_2$ gas is fed to the converter. Often the pre-heated catalysts will not be at their optimal operating temperatures, which may result in considerable $SO_2$ emissions for a period of time because not all $SO_2$ is converted to $SO_3$. Initially, $SO_2$ is therefore typically fed to the converter at lower concentrations, as compared to design specifications, and then slowly ramped up to full capacity. So the pre-heating with hot air and the subsequent introduction of $SO_2$ gas at a relatively low catalyst temperature together lead to increased emissions of $SO_2$ and $SO_3$ compared to steady-state emissions.

The dynamic behavior of the catalytic converter is of major importance in these situations. The catalytic oxidation of $SO_2$ to $SO_3$ according to reaction (1) is an exothermal and reversible reaction, which is carried out in fixed adiabatic beds of a sulfuric acid catalyst. Such catalysts are based on vanadium oxides promoted with alkali metal sulfates on an inactive porous silica support. In these supported liquid phase catalysts, the oxidation of $SO_2$ takes place as a homogeneous reaction in a liquid film covering the internal surface of the support material. A special property of these catalysts is their significant absorption capacity for sulfur oxides. The absorption is exothermic and may formally be written as $$SO_3 + A <-> A.SO_3 + \text{heat} \tag{2}$$

where A denotes a species in the melt which is able to chemically bind $SO_3$. At operating conditions, the sulfur oxides are bound mainly as the alkali metal pyrosulfates $M_2S_2O_7$ and $M_2S_3O_{10}$ (M=Na, K, Cs), but if the catalyst is blown with hot air for a long time, then up to 10% of the catalyst weight is desorbed as $SO_2/SO_3$, leaving the alkali metals behind as sulfates $M_2SO_4$. The main purpose of initially heating a sulfuric acid plant with hot air is to bring the catalyst beds above the minimum temperatures required for the oxidation of $SO_2$ to $SO_3$. However, during this heating some $SO_3$ is desorbed from the catalyst due to the $SO_3$ partial pressure resulting from the left-hand side of reaction (2). Part of the $SO_3$ slip from the catalytic converter will be emitted through the stack. This is because the downstream $SO_3$ absorber is not running efficiently during start-up.

Once the catalytic beds are heated sufficiently, gas containing $SO_2$ and $O_2$ is fed to the catalytic converter. Most of the $SO_2$ will be oxidized to $SO_3$ according to reaction (1) but compared to the steady-state operation, an excessive $SO_2$ slip is experienced during the start-up due to unfavorable temperature profiles in the catalytic beds. This $SO_2$ slip will be emitted through the stack.

The conventional way of minimizing the $SO_3$ slip during start-up is to purge the converter with hot air during shut-down. This procedure desorbs $SO_3$ from the catalyst and shifts reaction (2) to the left, thus reducing the amount of free $SO_3$ in the catalyst. Although this method reduces the $SO_3$ release in the subsequent start-up situation, a long shut-down time and high energy consumption for air heating is required, which is not economical for the sulfuric acid plant.

The conventional way of minimizing the $SO_2$ slip during start-up is to use a long air heating period to secure high enough catalyst temperatures for $SO_2$ conversion and a slow ramp-up of $SO_2$ feed. This requires a long start-up time and high energy consumption for air heating, which again is not economical for the sulfuric acid plant.

The idea underlying the present invention is to use one or more of the final catalytic beds as absorbents for $SO_2$ and $SO_3$ during start-up by using one or more separate purges, either separately or simultaneously, of one or more beds prior to the final bed with hot air during the previous shut-down.

Thus, the present invention relates to a method for reduction of start-up $SO_2$, $SO_3$ and $H_2SO_4$ emissions in sulfuric acid production, in which $SO_2$ is converted to $SO_3$ in n successive catalyst beds, where n is an integer >1, wherein
the final catalytic beds are used as absorbents for $SO_2$ and $SO_3$ during the start-up procedure,
wherein one or more of the m beds downstream the first bed are purged, either separately or simultaneously, with hot gas, where m is an integer >1 and m<n, during the previous shut-down, and
one separate purge with hot gas is used on the final bed.

This means that, instead of using one separate purge on one specific downstream bed, it is possible to purge two or more downstream beds, either separately or simultaneously, and still obtain good results.

Preferably, the separate purge with hot gas on is used on the bed prior to the final bed, feeding the gas from the purged bed to the final bed.

Further, the invention relates to a sulfuric acid plant design provided with means for securing reduced start-up emissions of $SO_2$, $SO_3$ and $H_2SO_4$, said plant design comprising n successive catalyst beds, where n is an integer >1, wherein the final catalytic beds are used as absorbents for $SO_2$ and $SO_3$ during the start-up procedure, and wherein said means comprises use of a separate purge with hot gas of bed m, where m is an integer >1 and m<n, during the previous shut-down.

This separate purging, which constitutes the crux of the present invention, is illustrated in FIG. 1, which also illustrates the normal operation and the normal shut-down purging. All three situations are illustrated for a plant design comprising four catalyst beds (i.e. n=4).

Figure 2:
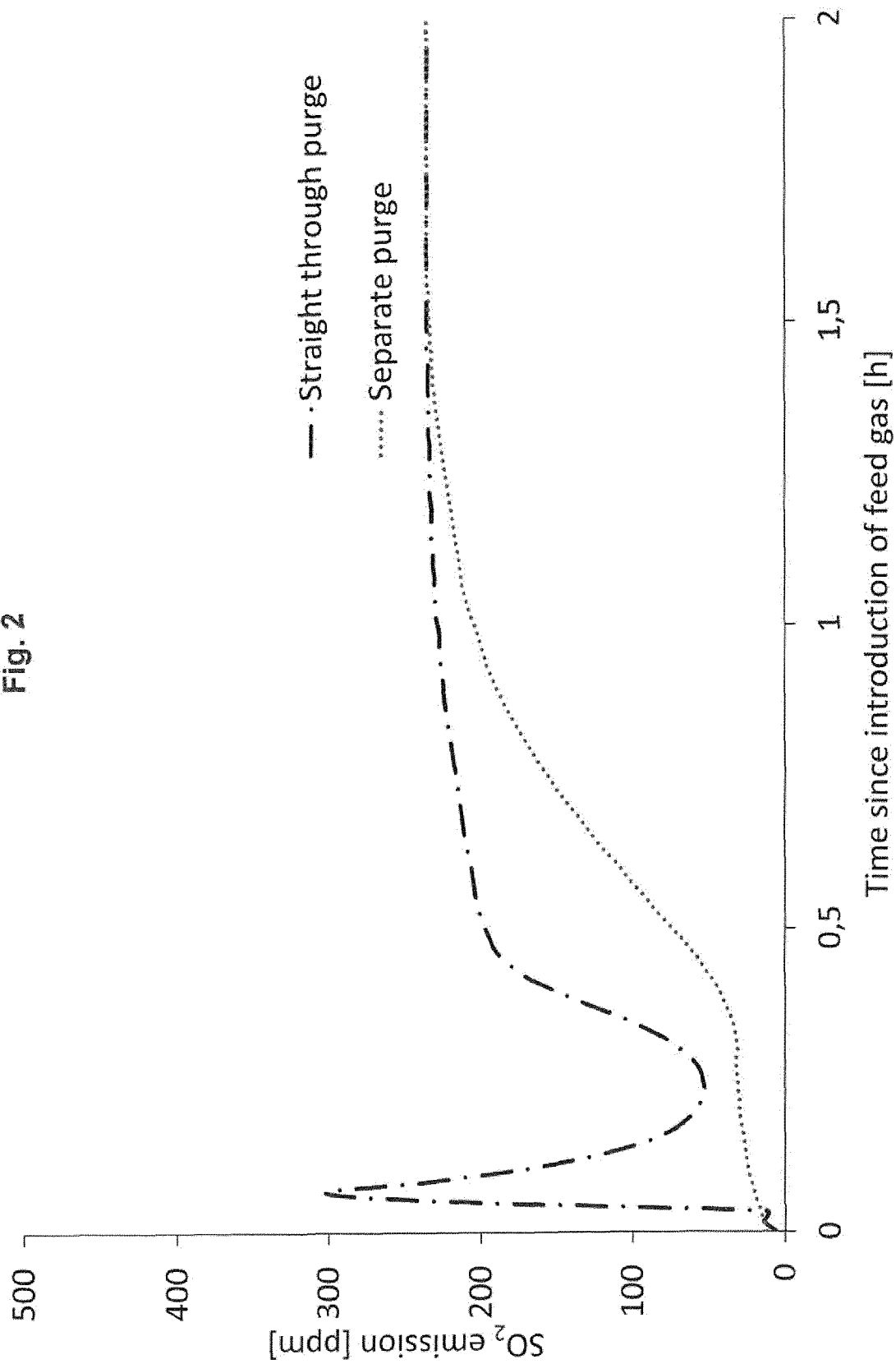

In FIG. 2, the separate purge according to the invention is compared to the straight-through purge of the prior art.

FIG. 1 illustrates, from left to right, the normal operation (prior art), the normal shut-down purging (prior art) and the separate purging according to the invention, all illustrated for a plant design comprising four catalyst beds (i.e. n=4), and FIG. 2 shows a comparison of the separate purge according to the invention and the straight-through purge of the prior art as regards SO2 emission [ppm] as a function of time passed after introduction of feed gas [h]."

Normally, $SO_3$ is purged from the catalyst during shut-down by passing hot air to the converter inlet and through all catalyst beds connected in series. The heat is primarily supplied by residual heat accumulated in the front-end of the plant (e.g. sulfur burner, boiler(s), ducting etc.). However, due to the above reaction (2), the $SO_3$ released from the upper beds will accumulate in the final bed. If purging is not long enough, or if the temperatures are too low for reaction (2) to proceed to the left, then the $SO_3$ desorption will cease. As a consequence, the concentration of free $SO_3$ in the final bed is high at the next start-up, which will lead to $SO_3$ emissions as described above.

In the process and the plant according to the invention, the shut-down procedure is changed. The hot air used for purging the upper catalyst beds is not sent to the final catalyst bed, but rather to an $SO_3$ absorption tower before going to the stack. The final catalyst bed is purged separately with hot air, and as a result, the final bed desorbs $SO_3$ and shifts reaction (2) to the left. During the next start-up, the sulfur-deficient final catalyst bed will act as a sulfur oxide filter and absorb both $SO_2$ and $SO_3$ due to reaction (2) and the reaction

$$SO_2 + 1/2 O_2 + A <-> A.SO_3 + heat \qquad (3)$$

where A is a species in the melt which is able to chemically bind $SO_3$ as mentioned earlier.

In this way the emissions of $SO_2$ and $SO_3$ are reduced during start-up, and the plant can be started up faster without violating $SO_2$ and $SO_3$ limits for transient operation.

The rate of reaction (1) is very low for vanadium-based catalysts at temperatures below 370-400° C. depending on the specific catalyst type and gas composition. Now it has surprisingly been found that the rate of reaction (3) is high, even at low temperatures, for a sulfur-deficient catalyst which can remove $SO_2$ at temperatures well below 350° C.

Regarding the catalyst, a preferred catalyst comprises a vanadium(V) compound such as $V_2O_5$, sulfur in the form of sulfate, pyrosulfate, tri- or tetrasulfate and alkali metals, such as Li, Na, K, Rb or Cs, on a porous carrier. The porous carrier of the catalyst is preferably silicon dioxide ($SiO_2$) with less than 10 wt %, preferably less than 5 wt %, more preferably less than 2 wt % and most preferably less than 1 wt % of alumina.

It is preferred that the alkali metal content of the catalyst is 2-25 wt %, more preferably 4-20 wt % and most preferably 8-16 wt %.

A preferred catalyst contains 1-15 wt %, preferably 2-12 wt % and most preferably 4-10 wt % of a vanadium(V) compound such as $V_2O_5$.

Further it is preferred that the catalyst contains 1-25 wt %, more preferably 2-20 wt % and most preferably 3-18 wt % sulfur in the form of sulfate, pyrosulfate, tri- or tetrasulfate. It is even more preferred that the catalyst contains 4-16 wt % sulfur, especially 4-10 wt % sulfur, in the form of sulfate, pyrosulfate, tri- or tetrasulfate.

It is preferred that the hot gas is air fed to the final bed at a temperature of 0-650° C., preferably 400-600° C.

The invention is illustrated further in the following example.

EXAMPLE

By using the method and the plant design according to the invention, the emissions of $SO_2$ and $SO_3$ are reduced during start-up, and the plant can be started up faster without violating $SO_2$ and $SO_3$ limits for transient operation. This reduction of emissions is illustrated in FIG. 2.

The basis of the example is a transient model for dynamic operation of an $SO_2$ converter published by Sørensen et al. (Chemical Engineering Journal 278 (2015), 421-429). The mathematical model is capable of predicting the changes occurring in an $SO_2$ converter due to changes in the operating conditions, because it can predict the dynamic changes in the temperature of the converter and the sulfur content of the catalyst.

In this example, a 3+1 double absorption plant is purged with 450° C. for 8 hours before the air supply is turned off. The plant is subsequently assumed to be shut down for a non-specific period of time and the beds re-heated to temperatures of 550° C., 460° C., 420° C. and 380° C., respectively, prior to introduction of the $SO_2$ feed gas.

The curves in FIG. 2 show the $SO_2$ emission in ppm as a function of the time passed (in hours) for both the straight-through purge and the separate purge embodiment. It appears clearly from the curves that the straight-through purge causes a substantial $SO_2$ emission immediately after introducing the feed gas. Within minutes after the feed gas introduction, the $SO_2$ emission increases to 300 ppm, whereas the separate purge according to the invention leads to a much lower $SO_2$ emission, especially during the first half hour following the feed gas introduction. Only after around 1.5 hours from the feed gas introduction, the two curves approach the same $SO_2$ emission level.

The invention claimed is:

1. A method for reduction of start-up $SO_2$, $SO_3$ and $H_2SO_4$ emissions in sulfuric acid production, in which $SO_2$ is converted to $SO_3$ in a set of successive catalyst beds connected in series, the method comprising:
   flowing a waste gas stream comprising $SO_2$ through the set of catalyst beds;
   shutting down the catalyst beds, the shutting down comprising:
      isolating at least one final downstream catalyst bed from the set of catalyst beds;
      leaving all other catalyst beds of the set connected in series;
      flowing a first heated purge gas stream through the at least one final downstream catalyst bed;
      flowing a second heated purge gas stream through the other catalyst beds;
   starting up the set of catalyst beds, the starting up comprising:
      placing the at least one final catalyst beds back in series with the other catalyst beds; and
      absorbing $SO_2$ and $SO_3$ into a catalyst of the at least one final downstream catalyst bed during the starting up.

2. A method according to claim 1, wherein the shutting down comprises:
   isolating at least two final downstream catalyst beds from the set of catalyst beds;
   configuring the penultimate catalyst bed and final downstream catalyst beds in series; and
   flowing the first hot purge gas stream through the penultimate catalyst bed prior to the final downstream catalyst bed.

3. A method according to claim 1, wherein the shutting down comprises:
   isolating two or more beds from the other catalyst beds, downstream of the first catalyst bed; and
   purging each isolated catalyst bed separately with hot purge gas.

4. A method according to claim 1, wherein the shutting down comprises:
   isolating two or more beds from the other catalyst beds, downstream of the first catalyst bed; and
   purging each isolated catalyst bed simultaneously with hot purge gas.

5. A method according to claim 1, where the catalyst comprises a vanadium(V) compound, sulfur in the form of sulfate, pyrosulfate, tri- or tetrasulfate and alkali metals, such as Li, Na, K, Rb or Cs, on a porous carrier.

6. A method according to claim 5, wherein the porous carrier of the catalyst comprises silicon dioxide ($SiO_2$).

7. A method according to claim 6, wherein the porous carrier of the catalyst comprises $SiO_2$ with less than 10 wt % of alumina.

8. A method according to claim 7, wherein the porous carrier of the catalyst comprises $SiO_2$ with less than 2 wt % of alumina.

9. A method according to claim 8, wherein an alkali metal content of the catalyst is 2-25 wt %.

10. A method according to claim 9, wherein the alkali metal content of the catalyst is 8-16 wt %.

11. A method according to claim 1, wherein the first heated purge gas stream is air fed to the final catalyst bed at a temperature of 400-600° C.

12. A method according to claim 5, wherein the catalyst contains 1-15 wt % of a vanadium(V) compound such as $V_2O_5$.

13. A method according to claim 5, wherein the catalyst contains 1-25 wt % sulfur in the form of sulfate, pyrosulfate, tri- or tetrasulfate.

14. A method according to claim 13, wherein the catalyst contains 2-20 wt % sulfur, in the form of sulfate, pyrosulfate, tri- or tetrasulfate.

15. A method according to claim 14, wherein the catalyst contains 4-16 wt % sulfur in the form of sulfate, pyrosulfate, tri- or tetrasulfate.

16. A method according to claim 12, wherein the catalyst contains 2-12 wt % of a vanadium(V) compound such as $V_2O_5$.

17. A method according to claim 16, wherein the catalyst contains 4-10 wt % of a vanadium(V) compound such as $V_2O_5$.

18. A method according to claim 7, wherein the porous carrier of the catalyst comprises $SiO_2$ with not greater than 5 wt % of alumina.

19. A method according to claim 8, wherein the porous carrier of the catalyst comprises $SiO_2$ with not greater than 1 wt % of alumina.

20. A sulfuric acid plant design provided with means for securing reduced start-up emissions of $SO_2$, $SO_3$ and $H_2SO_4$, said plant design comprising a set of successive catalyst beds connnected in series, wherein:
   a waste gas stream comprising $SO_2$ is flowed through the set of catalyst beds;
   at least one final downstream catalyst bed is isolated from the set of catalyst beds during shut down, leaving all other catalyst beds of the set connected in series
   a first heated purge gas stream is flowed through the at least one final downstream catalyst bed during shut down;
   a second heated purge gas stream is flowed through the other catalyst beds during shut down;
   the at least one final catalyst beds are placed back in series with the other catalyst beds; and $SO_2$ and $SO_3$ is absorbed into a catalyst of the final downstream catalyst bed during start up.

* * * * *